US007062262B2

(12) United States Patent
Baird

(10) Patent No.: US 7,062,262 B2
(45) Date of Patent: Jun. 13, 2006

(54) METHOD AND APPARATUS FOR TRACING COMPONENTS OF A PRODUCTION CHAIN

(75) Inventor: Kenneth James Baird, Hillsborough (GB)

(73) Assignee: Moy Park Limited, Craig Avon (GB)

( * ) Notice: Subject to any disclaimer, the term of this patent is extended or adjusted under 35 U.S.C. 154(b) by 239 days.

(21) Appl. No.: 10/468,118

(22) PCT Filed: Feb. 19, 2002

(86) PCT No.: PCT/GB02/00711

§ 371 (c)(1),
(2), (4) Date: Aug. 14, 2003

(87) PCT Pub. No.: WO02/067063

PCT Pub. Date: Aug. 29, 2002

(65) Prior Publication Data
US 2004/0078289 A1 Apr. 22, 2004

(30) Foreign Application Priority Data
Feb. 19, 2001 (GB) ................................ 0104049.2

(51) Int. Cl.
H04Q 7/20 (2006.01)

(52) U.S. Cl. .................. 455/419; 455/414.1; 455/420; 705/26; 340/539.13

(58) Field of Classification Search ................ 455/403, 455/404.1, 412.1, 412.2, 414.1, 418, 419, 455/420; 705/26, 27, 28, 29; 340/539.1, 340/539.13, 539.15, 539.16, 539.17
See application file for complete search history.

(56) References Cited

U.S. PATENT DOCUMENTS

| 4,819,176 A | 4/1989 | Ahmed et al. |
| 5,231,585 A | 7/1993 | Kobayashi et al. |
| 5,283,943 A | 2/1994 | Aguayo et al. |
| 5,381,340 A | 1/1995 | Ueda et al. |
| 5,432,702 A | 7/1995 | Barnett |

(Continued)

FOREIGN PATENT DOCUMENTS

EP 0562622 3/1993

(Continued)

OTHER PUBLICATIONS

PCT international search report, App # PCT/Gb 02/00711, May 15, 2002.

(Continued)

Primary Examiner—CongVan Tran
(74) Attorney, Agent, or Firm—Stout, Uxa, Buyan & Mullins, LLP; Frank J. Uxa; Carlos A. Fisher

(57) ABSTRACT

A method of tracking, at a remote, central information store 140, elements in a production chain. The chain comprises a plurality of processes, 20, 40, 60, 80, 100, 120, each process having one or more input ingredients 10, 30, 50, 70, 90, 110 and one or more output products, 30, 50, 70, 90, 110, 130. The central information store 140 is remote from the location of at least one of the processes. The method comprises carrying out the following steps in respect of each of the processes 20, 40, 60, 80, 100, 120: (1) recording at the remote central information store 140, via a telecommunications link, an identifier identifying each of the input ingredients of the process; (2) marking each of the output products of the process with a respective identifier; and (3) recording at the remote central information store 140, via a telecommunications link, the identifiers of each of the output products.

22 Claims, 5 Drawing Sheets

U.S. PATENT DOCUMENTS

| | | | | |
|---|---|---|---|---|
| 5,640,002 A | * | 6/1997 | Ruppert et al. | 235/462.46 |
| 5,751,581 A | | 5/1998 | Tau et al. | |
| 6,083,543 A | * | 7/2000 | Kim et al. | 426/231 |
| 6,192,395 B1 | * | 2/2001 | Lerner et al. | 709/204 |
| 6,317,438 B1 | * | 11/2001 | Trebes, Jr. | 370/466 |
| 6,509,830 B1 | * | 1/2003 | Elliott | 340/286.02 |
| 2004/0078274 A1 | * | 4/2004 | Aarnio | 705/26 |
| 2004/0154316 A1 | * | 8/2004 | Kateman | 62/60 |

FOREIGN PATENT DOCUMENTS

| | | |
|---|---|---|
| EP | 0652539 | 10/1994 |
| EP | 0810499 | 12/1997 |
| EP | 0875365 | 11/1998 |
| JP | 411126275 A * | 5/1999 |
| WO | WO 0026111 | 5/2000 |

OTHER PUBLICATIONS

UK search report, App # GB 0104049.2, Oct. 31, 2001.

*Long Term Prospects for the Beef Industry*, 56th EAAE Seminar, Paris, Feb. 26-27, 1998: McCarthy et al., "Irish Consumer Perception and Beef Consumption Patterns—An Analysis," pp. 305-312, Department of Food Economics, University College, Cork, Ireland.

*Long Term Propects for the Beef Industry*, 56th EAAE Seminar, Paris, Feb. 26-27, 1998: Timon et al., "An Evaluation of Traceability Systems along the Irish Beef Chain," pp. 219-225, Department of Food Economics, University College, Cork, Ireland.

* cited by examiner

METHOD AND APPARATUS FOR TRACING COMPONENTS OF A PRODUCTION CHAIN

This invention relates to the tracing of components, in particular but not exclusively food ingredients and products, of a production chain.

Consumers desire ever-more information about the origins and constituents of their food, in order to enable them to make purchasing decisions. The introduction of the first genetically modified (GM) products, for example, has led to a clear demand for segregation of GM products from other products in the food chain; indeed, European Union regulations require that any foods, sold through retail outlets, that contain GM corn or GM soy ingredients must be labelled accordingly.

In recent years, the food industry has also suffered a number of crises that have shaken confidence in its ability to supply safe and wholesome foodstuffs to the consumer. Food scares have included listeria in eggs, bovine spongiform encephalitis (BSE) in beef, and *E. coli* in butchers' shops and catering outlets. One of the worst crises in recent years was the Dioxin crisis in Belgium, which had a serious impact on the Belgian economy and adversely affected firms across Europe.

Modern supply chains are often complex. Existing tracing systems, many of them paper-based, are labour intensive, slow and carry a significant potential for human error. Consequently, when a problem such as contamination is discovered, it is often difficult for manufacturers to give rapid assurances that all contaminated products have been identified and withdrawn from sale. Delay can result in loss of consumer confidence in a far wider range of products than those that have in fact been contaminated. At present, it may even be necessary for entire product supply chains to be stopped, which can be a costly exercise.

An object of the invention is to mitigate problems associated with existing tracing systems and to provide fast and accurate batch traceability throughout the whole supply chain.

According to the invention there is provided a method of tracking, at a remote, central information store, elements in a production chain, the chain comprising a plurality of processes, each process having one or more input ingredients and one or more output products, and the central information store being remote from the location of at least one of the processes, the method comprising carrying out the following steps in respect of each of the processes:

(1) recording at the remote central information store, via a telecommunications link, an identifier identifying each of the input ingredients of the process;

(2) marking each of the output products of the process with a respective identifier; and (3) recording at the remote central information store, via a telecommunications link, the identifiers of each of the output products.

(The steps of the method may be carried out in an order different from that set out above; for example, the identifier of each of the output processes may be recorded at the central information store before the output products are marked)

A production chain generally comprises a plurality of discrete processes occurring in series (continuous processes can be made discrete by division into time slots). Here, a "process" is defined as anything which changes the composition incorporating the material(s) in question. Thus, blending different ingredients together, or converting feed into chickens are examples of processes. Shipping material from one location to another or storing material for a period of time are not processes.

Each process has a number of distinct input ingredients, which may be similar ingredients from different batches or completely different ingredients. Each process will produce one or more output products; for example, a blending process may have one output, while a chicken portioning process may have several outputs (such as wings, drums and thighs).

The identifiers are stored in the central information store, where they can be accessed via a query. The data can thereby be sorted and arranged to present a coherent and verifiable web of network connections between input ingredients, processes and output products, making it possible to visualise the supply chain of any or all of the components of the final product. It is thus possible to identify the range of finished products that contain a particular ingredient or to prove the source of ingredients used in a particular finished product, for example to identify country of origin or the presence of GM foodstuffs.

In the presently existing situation, if records are held at all, the operator of each process in the production chain holds its own data. The data is held in widely varying formats, which include a mix of paper-based systems and computer records, which may hold huge volumes of data in large food factories, for example. A trace search involves numerous telephone calls, much searching for paper and cross-checking information. The search is labour-intensive and time-consuming and tracing exercises can take several days and many man hours to complete, a timescale that increases for more complex tasks, such as ensuring that a food-supply chain is free of GM products.

However, in contrast, the invention is intended to provide an integrated tracing system, enabling tracing from raw ingredients through to a finished commercial product.

The plurality of processes may be located at a plurality of different locations. A significant advantage of the invention is that at least one of the plurality of processes is located at a location remote from the central information store. It will be understood that the central information store is "remote" if it is located at a separate site from the process, and not, for example, merely at a different place in the same factory. Preferably, the central information store is located more than 1 km from at least one of the processes. Preferably, the information store is remote from the location of a plurality of the processes. Preferably, the information store is remote from the location of all of the processes. The central information store may thus be administered, or at least monitored, by an entity independent from the process operators; public confidence in the independence and objectivity of the method may thus be established and maintained.

Furthermore, marking each of the output products with an identifier and reading the identifiers of each of the input ingredients renders close tracking of individual products unnecessary. Regardless, for example, of how and where each product is transported, it will be picked up again when it is used as an ingredient in a subsequent process.

It may be that the production chain comprises other processes that are not dealt with in accordance with the invention, if useful traceability of elements in the production chain remains possible under those circumstances.

Preferably, an identifier identifying the process is recorded at the central information store.

Preferably, the identifier marked on the output product identifies the process. More preferably, the identifier marked on the output product includes a pre-allocated element identifying the process.

Use of a pre-allocated element identifying the process allows each product of the process to be allocated a code, identifying the process, without a need for reference to the central information store or another central authority.

Preferably, the identifier marked on the output product identifies the date and time of production.

Of particular importance is the case where the production chain is producing a food product and especially where the food product is for human consumption; alternatively, the food product may be for animal consumption. Examples of other production chains in which the invention could be embodied would be those producing textiles, pharmaceuticals, or medical/veterinary devices.

Preferably, the input ingredients are marked with a barcode representing the identifier and the method comprises the step of scanning the barcodes to read the identifier that is to be recorded at the central information store. Preferably, the identifier that is marked on each of the output products is a barcode. More preferably, the barcode marked on each of the output products enables identification of the process by which the output product is produced and the date and time of production.

Alternatively, the identifiers identifying any or all of the input ingredients, the process or the output products may be a Radio Frequency Identification Chip (RFID Chip). RFID Chips enable containers to be re-circulated in a factory, potentially leading to a label-free environment.

Alternatively, the identifiers identifying any or all of the input ingredients, the process or the output products may be recorded in the central information store by manual entry into a form readable by a computer. The form may be an electronic form displayed on, for example, a desktop or laptop computer monitor or a personal digital assistant (PDA) or other handheld computing device. This approach is particularly appropriate for small-scale processes in the production chain for which, for example, reading and automated production of barcodes is not practically or not commercially viable. In such processes, input identifiers may be visually inspected by an operator. An output identifier may be manually applied to each output product, for example by affixing a label carrying the identifier to the product or by direct manual marking of the product with the identifier. Alternatively, details of the output identifiers may be passed directly to the operators of the next process or processes (if any) in the production chain.

Preferably, the identifiers are recorded using a secure communications protocol, such as a virtual private network.

Preferably, the method further comprises the step of querying the central information store to identify ingredients, processes and/or products upstream or downstream from a specified ingredient, process or product.

Thus, for example, if a defect is detected in a finished product, it is possible to ascertain, using an upstream (backward) trace, all ingredients that directly or indirectly (as ingredients of earlier processes) went into the finished product, all processes that processed those ingredients, and all products of those processes, which may themselves be ingredients of the finished product or intermediate products. Similarly, if, for example, contamination of an ingredient is detected, it is possible, using a downstream (forward) trace to ascertain all products that were directly or indirectly produced using the ingredient. Another example of a reason to carry out a trace would be to confirm that a particular line of food products does not contain genetically modified material.

Preferably, a telecommunications link is utilised in querying the central information store. More preferably, the query is communicated to the central information store using a secure communications protocol, such as a virtual private network.

Preferably, the method further includes the step of communicating to operators of processes related to a query a request for authorisation to release data in response to that query and processing their responses.

Also according to the invention, there is provided a production-chain-element tracing apparatus for tracing elements in a production chain that comprises a plurality of processes, the tracing apparatus comprising a central information store that is remote from the location of at least one of the processes and that comprises a plurality of records, each record comprising identifiers of one or more ingredients input into a process and identifiers of one or more products output from the process, the apparatus further comprising an interface for recording, via a telecommunications link, identifiers in the records, an interface for inputting a query regarding relationships between the ingredients, the processes and/or the products, and a query engine for generating, in response to the query, at least part of the web of ingredients, processes and products upstream or downstream of an ingredient, process or product that has been specified in the query.

Preferably, the interface for recording identifiers and/or the interface for inputting a query is a secure communications link, such as a virtual private network.

Also according to the invention there is provided a method of tracking, at a central information store, elements in a production chain, the chain comprising a plurality of processes, each process having one or more input ingredients and one or more output products, wherein, for each of at least some of the processes, the following steps are carried out:

(1) recording at the central information store an identifier identifying each of the input ingredients of the process;

(2) marking each of the output products of the process with a respective identifier; and (3) recording at the central information store the identifiers of each of the output products.

Preferably, the central information store is remote from the locations of at least some of the processes and a telecommunications link is utilised in recording the identifiers.

Also according to the invention there is provided a production-chain-element tracing apparatus for tracing elements in a production chain that comprises a plurality of processes, the tracing apparatus comprising a plurality of records, each record comprising identifiers of one or more ingredients input into a process and identifiers of one or more products output from the process, the apparatus further comprising an interface for recording identifiers in the records, an interface for inputting a query regarding relationships between the ingredients, the processes and/or the products, and a query engine for generating, in response to the query, at least part of the web of ingredients, processes and products upstream or downstream of an ingredient, process or product that has been specified in the query.

An embodiment of the invention will now be described, by way of example only, with reference to the accompanying drawings, of which:

Figure 1:
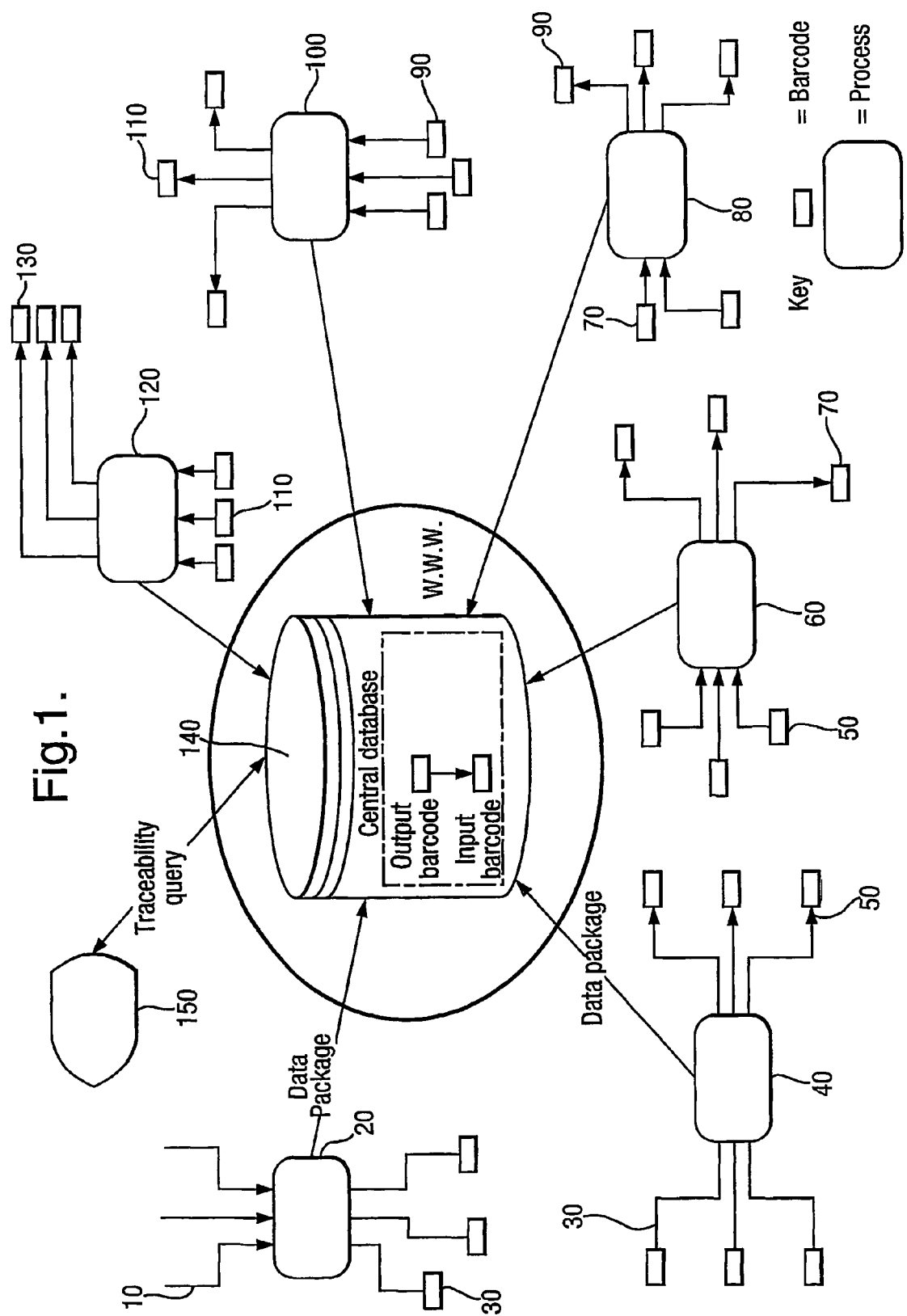
FIG. 1 is a flow diagram showing how, in the example according to the invention, various processes generate data for inclusion in the central information store.

In an embodiment of a method according to the invention, traceability of chicken products is provided using production-chain-element tracing apparatus. A number of processes contribute to turning raw materials into chicken products (FIG. 1). Following a single line from raw materials to a retail product, a series of processes take place. Raw materials 10 are input into a Soya bean farm 20, which in turn produces Soya beans 30. The beans 30 are input into a Soya-bean crusher 40, which produces Soya meal 50. The Soya meal 50 is input into a feedmill 60, which produces feed 70. The feed 70 is input into a chicken farm 80, which produces chickens 90. The chickens 90 are input into a slaughter house 100, which produces carcasses 110. The carcasses 110 are then processed further, in further process 120, according to the nature of the final retail chicken product 130 concerned; for example, the carcasses 110 may be portioned and the portions packed for sale as chicken portions or further processed by de-boning, comminuting and reforming into a further processed product. Of course, each process may have other input ingredients and produce other output products; for example, the feed produced by the feed mill may be used to feed other livestock and medications may be another input into the chicken farm. Identifiers identifying each input, each process and each output are recorded at a central information store 140. Identifiers of outputs from earlier processes are matched in central information store 140 with identifiers of input barcodes from later processes.

In the embodiment, many different process operators are supplying data from different stages of the production chain. The central information store 140 is accessed over the Internet via a Virtual Private Network (VPN) (Of course, other suitable means to access the Internet may become available in the future and are within the scope of the invention). Reporting tools 150 are provided to enable online extraction of information in response to queries from customers. Data-handling at the central information store 140 is fully automated, with no need for human intervention under normal circumstances. The secure VPN connection ensures that only authorised users are able to access the central information store. In order to protect commercial interests, full details of ingredient and product webs are not necessarily disclosed; rather, only specific assurances are given regarding supply chains or sources or specific queries are answered. To enable this to be credible, the system is monitored and independently assessed by credible third-parties.

Figure 2:
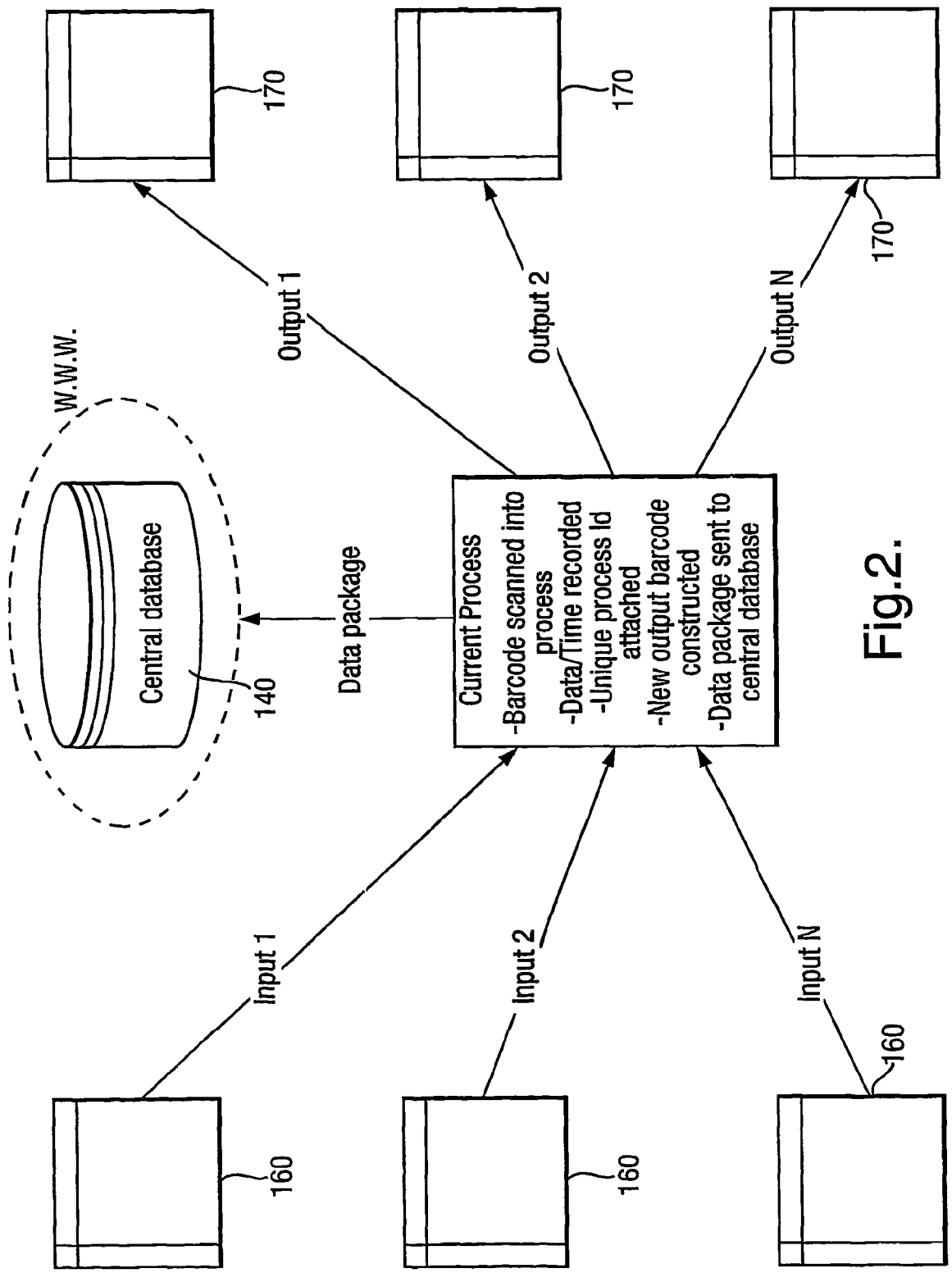
FIG. 2 is a flow diagram showing how data are generated from an example process.
Figure 3:
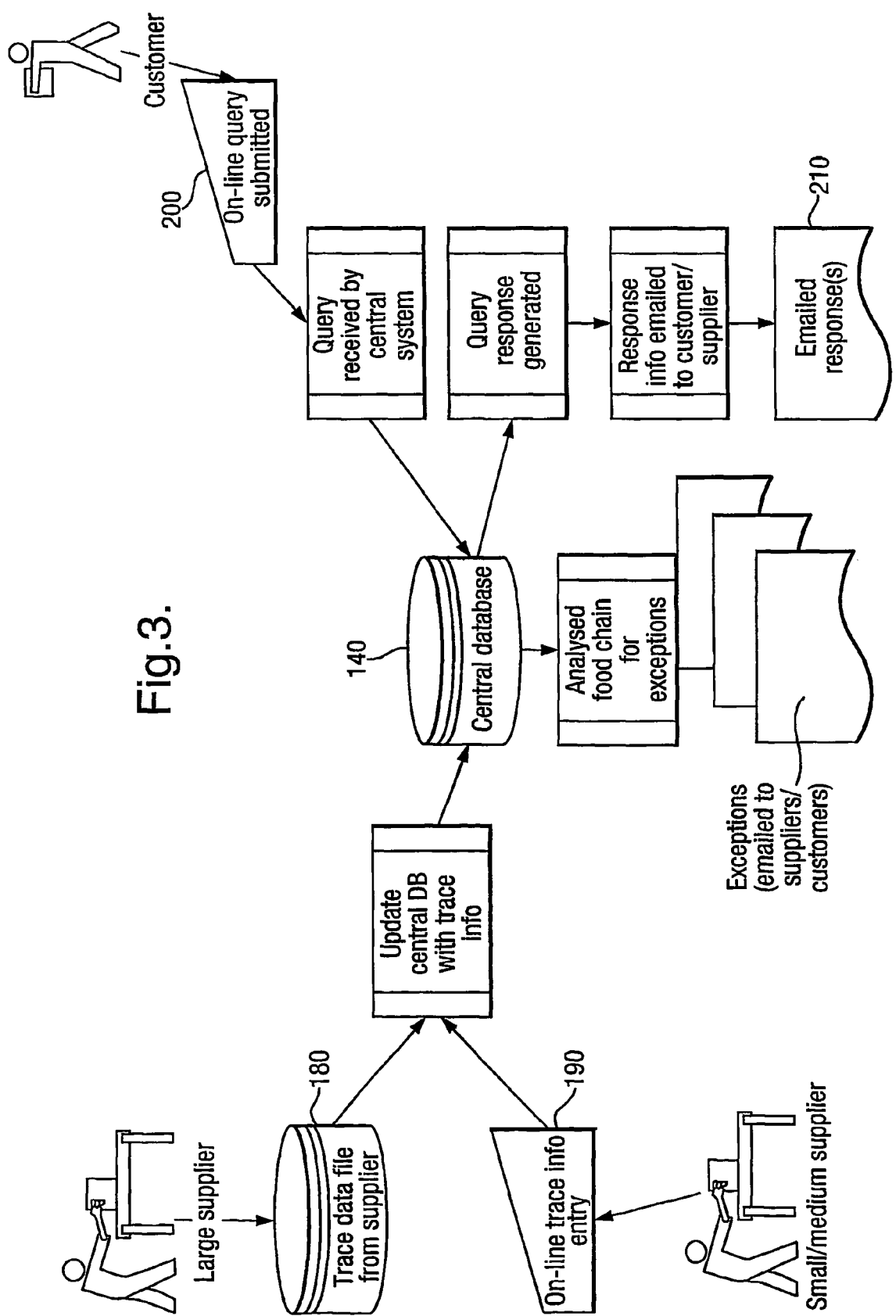
FIG. 3 is a flow diagram showing in more detail how data are input to the central information store and how queries are handled.

The data are passed to the central information store 140 in a trace-data package (FIGS. 2 and 3). In the illustrated example, input ingredients have been bar-coded in a previous process; the bar-codes 160 are scanned and the data they contain, together with data identifying the process and data identifying each of the output products, are sent to the central information store 140. The identifier for the output products is constructed from the identifier for the process, which is unique, and from date and time data. The output products are then bar-coded with a new bar-code 170 comprising the identifier for the output products.

Bar-coding is not essential and it may not be appropriate for persons administering processes on a small scale. An alternative approach is for such an administrator to make direct entry of the data, for example via an online form. Identifiers would be read from the input ingredients and entered into the form, entered for the process and constructed for the output products from the process identification and date and time of production. The identifiers for the output products are independent of those for the input products; they are linked only in the central information store 140. The output products are then manually marked, if appropriate, or their identifiers are passed by other means to the operator of the next process, if any, for which they are input ingredients.

Different interfaces are used for receiving data input from different users. Trace-data files 180 from larger operators are passed to the central information store by dedicated software; trace data is input by smaller operators by accessing a form 190 over the VPN (FIG. 3). The form is accessible from many devices, such as a desktop PC or a handheld computing device. When the new trace data 180, 190 is received at the central information store 140, the database is updated.

A customer may obtain information regarding the food-chain extending to and/or from a particular product by submitting a query 200 over the VPN. When a query is received by the query interface at the central information store 140, the database is analysed and a response 210 is generated and e-mailed to the customer, and to suppliers if appropriate. The level of access by customers is controlled, so that commercially sensitive information is not deducible from the results of queries. For example, it may be appropriate for a query regarding whether or not a particular product includes GM ingredients to be answered with a simple affirmative or negative, rather than with a detailed breakdown of the supply web. In the event of contamination of an intermediate product in the supply chain, the central information store 140 can be informed by submission over the VPN and recall warnings can be automatically sent to all downstream process operators.

If an exception is discovered in the food chain after trace-data entry or in response to a query - that is, for example, if an unidentified process, input ingredient or output product is detected—then details of the exception are e-mailed to the supplier or to the customer.

Figure 4:
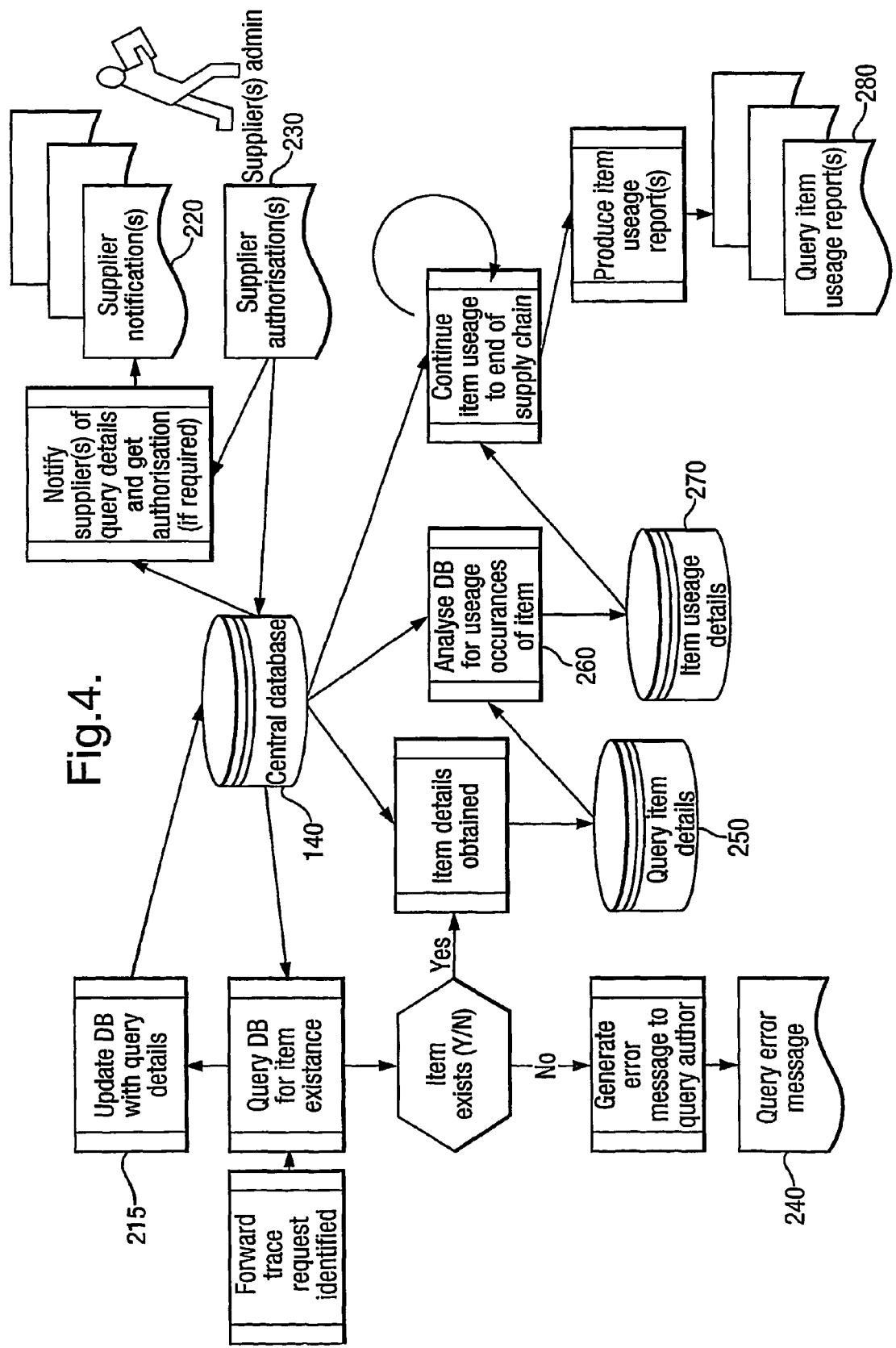
FIG. 4 is a flow diagram showing in still more detail how a forward-trace query is handled.
Figure 5:
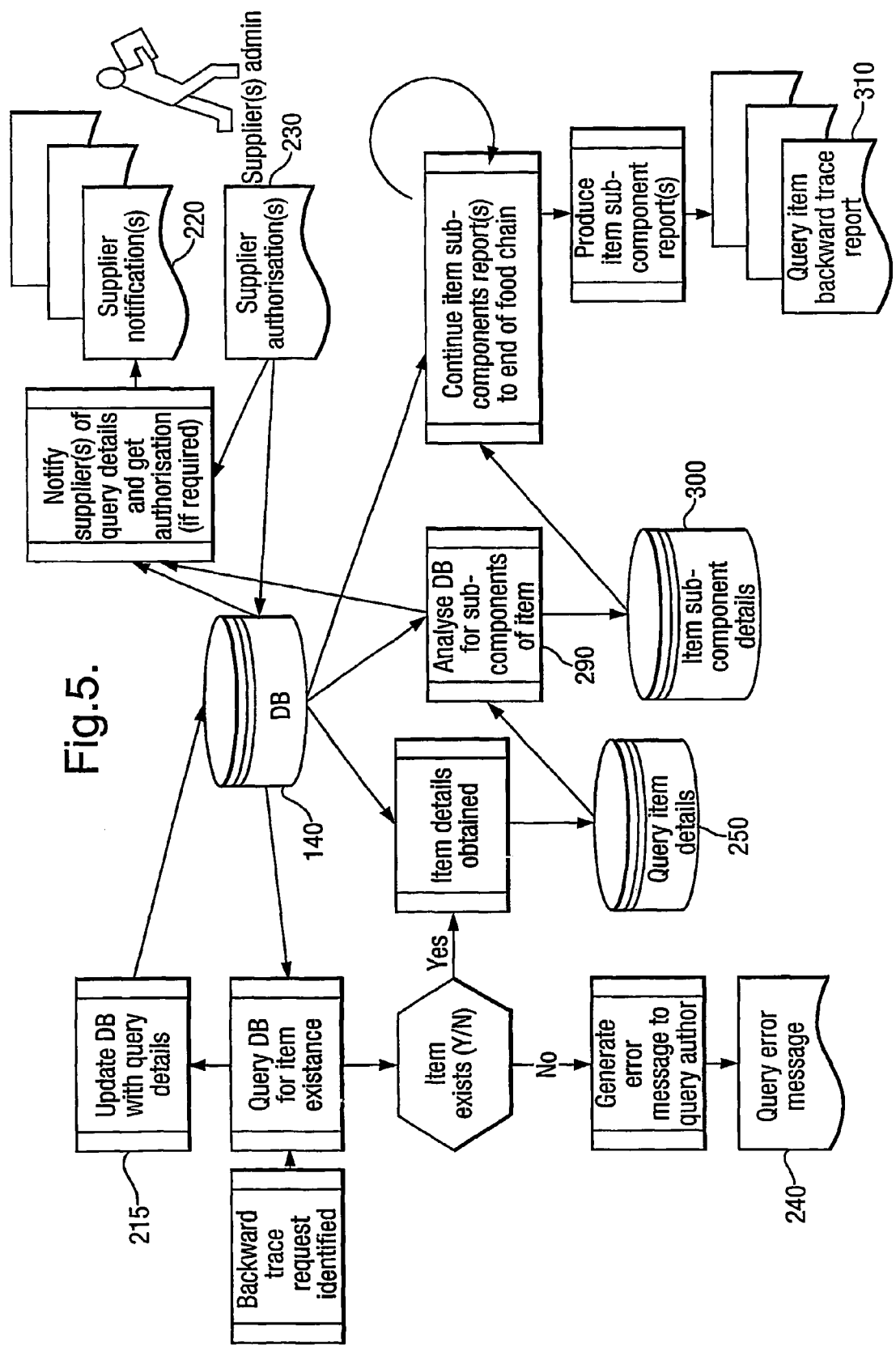
FIG. 5 is a flow diagram showing in still more detail how a backward-trace query is handled.

FIGS. 4 and 5 show the procedure followed at the central information store 140 when a trace query is received from a customer. Details 215 relating to the query, input via a query interface accessible over the VPN, are added to the database 140; such details include a Query Number, Query Date, Query Company, Membership Number, Query Type, Query Reason Code and Query Priority Code. If appropriate, relevant process operators 220 are notified at this or a later stage and authorisation 230 for releasing data is obtained. The database 140 is checked to confirm that the item to which the query relates exists and, if not, an error message 240 is generated and passed to the author of the query via the VPN. If the item exists, details 250 additional to those contained in the query are obtained; such details 250 include Processing Company ID, Item Code, Process Location, Process Country Code, Process Number, Process Owner, Production Date, Sell-by Date, Use-by Date.

In the case of a forward-trace request (FIG. 4), the database 140 is then analysed by a query engine 260 to identify the processes in which the target item was used as an input ingredient: item codes, process locations, process owners, customer names, dates of production, use-by dates and sell-by dates are generated 270 for the output products of each such process. The use history of that item has then been generated. The query is repeated for each of the output products identified and the iteration continues until the end of all chains have been reached and a complete use history, that is the complete web extending forwards from the target item, has been generated. The customer making the query, and process operators, if appropriate, are then notified of the results 280 of the query in detail appropriate to the nature of the query and their level of access permission; such results include Query number, Query Date, Query Author, Membership Number, Query Item Details, End Products, Interim Products (with appropriate operator authorisations) and Date of Use.

In the case of a backwards-trace request (FIG. 5), the database is analysed by a query engine 290 to determine the input ingredients making up the item to which the trace is directed. A list of ingredients 300 is generated, and then the ingredients of each of those items is generated from the database, the process being repeated until the beginning of all chains are reached and a complete list 310 of the ingredients directly or indirectly making up the target item is obtained. The customer making the query, and process operators, if appropriate, are then notified of the results 310 of the query in detail appropriate to the nature of the query and their level of access permission; such results include Query number, Query Date, Query Author, Membership Number, Query Item Details, Direct Ingredient Details, Indirect Ingredient Details (with appropriate operator authorisations) and Date of Use.

It will be appreciated that various modifications and variations can be made to the methods and apparatuses described above.

The invention claimed is:

1. A method of tracking, at a remote central information store, elements in a production chain, the chain comprising a plurality or processes, each process having one or more input ingredients and one or more output products, and the central information store being remote from the location of at least one of the processes, the method comprising carrying out the following steps in respect of each of the processes:
   1) recording at the remote central information store, via a telecommunications link, an identifier identifying each of the input ingredients of the process;
   2) marking each of the output products of the process with a respective identifier; and
   3) recording at the remote central information store, via a telecommunications link, the identifiers of each of the output products.

2. A method as claimed in claim 1, in which an identifier identifying the process is recorded at the central information store.

3. A method as claimed in claim 1, in which the identifier marked on the output product identified the process.

4. A method as claimed in claim 3, in which the identifier marked on the output product includes a pro-allocated element identifying the process.

5. A method as claimed in claim 1, in which the identifier marked on the output product identifies the date and time of production.

6. A method as claimed in claim 1, in which the production chain is producing a food product.

7. A method as claimed in claim 6, in which the food product is for human consumption.

8. A method as claimed in claim 6, in which the food product is for animal consumption.

9. A method as claimed in claim 1, in which the input ingredients are marked with a barcode representing the identifier and the method comprises the step of scanning the barcodes to read the identifier that is to be recorded at the central information store.

10. A method as claimed in claim 1, in which the identifier that is marked on each of the output products is a barcode.

11. A method as claimed in claim 1, in which the identifiers identifying any or all of the input ingredients, the process or the output products is a Radio Frequency Identification Chip.

12. A method as claimed in claim 1, in which the identifiers identifying any or all of the input ingredients, the process or the output products are recorded in the central information store by manual entry into a computer-readable form.

13. A method as claimed in claim 1, in which the identifiers are recorded using a secure -communications protocol.

14. A method as claimed in claim 13, in which the identifiers are recorded using a virtual private network.

15. A method as claimed in claim 1, in which the method further comprises the step of querying the central information store to identify ingredients, processes and/or products upstream or downstream from a specified ingredient, process or product.

16. A method as claimed in claim 15, in which a telecommunications link is utilised in querying the central information store.

17. A method as claimed in claim 16, in which the query is communicated to the central information store using a secure communications protocol.

18. A method as claimed in claim 17, in which the query is communicated to the central information store using a virtual private network.

19. A method as claimed in claim 15, in which the method further includes the step of communicating to operators of processes related to a query a request for authorisation to release data in response to that query aid processing their responses.

20. A production-chain-element tracing apparatus for tracing elements in a production chain that comprises a plurality of processes, the tracing apparatus comprising a central information store that is remote from the location of a least one of the processes and that comprises a plurality of records, each record comprising identifiers of one or more ingredients input into a process and identifiers of one or more output products from the process, the apparatus further comprising an interface for recording, via a telecommunications link, identifiers in the records, an interface for inputting a query regarding relationships between the ingredients, the processes and/or the products, and a query engine for generating, in response to the query, at least part of the web of ingredients, processes and products upstream or downstream of an ingredient, process or product that has been specified in the query.

21. An apparatus as claimed in claim 20, in which the interface for recording identifiers and/or the interface for inputting a query is a secure communications link.

22. An apparatus as claimed in claim 21, in which the interface for recording identifiers and/or the interface for inputting a query is a virtual private network.

* * * * *

UNITED STATES PATENT AND TRADEMARK OFFICE
CERTIFICATE OF CORRECTION

PATENT NO. : 7,062,262 B2  Page 1 of 1
APPLICATION NO. : 10/468118
DATED : June 13, 2006
INVENTOR(S) : Baird It is certified that error appears in the above-identified patent and that said Letters Patent is hereby corrected as shown below:

Column 7
Line 40, "or processes" should read --of processes--.

Column 7
Line 59, "pro-allocated" should read --pre-allocated--.

Column 8
Line 20, "-communications" should read --communications--.

Signed and Sealed this

Twenty-sixth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 7,062,262 B2
APPLICATION NO. : 10/468118
DATED : June 13, 2006
INVENTOR(S) : Baird Page 1 of 1

It is certified that error appears in the above-identified patent and that said Letters Patent is hereby corrected as shown below:

On the Title Page

Under Assignee, "Moy Park Limited, Craig Avon (GB)" should read

--TraceAssured Limited, Craigavon (GB)--.

Signed and Sealed this
Twenty-fourth Day of September, 2013

Teresa Stanek Rea
*Deputy Director of the United States Patent and Trademark Office*